US011248892B2

(12) United States Patent
Staton

(10) Patent No.: US 11,248,892 B2
(45) Date of Patent: Feb. 15, 2022

(54) SYSTEM AND METHOD FOR DESTRUCTIVELY PROCESSING AIRBAG INFLATORS

(71) Applicant: Clean Water Environmental, LLC, Dayton, OH (US)

(72) Inventor: John G. Staton, Wilmington, OH (US)

(73) Assignee: Clean Water Environmental, LLC, Dayton, OH (US)

( * ) Notice: Subject to any disclaimer, the term of this patent is extended or adjusted under 35 U.S.C. 154(b) by 27 days.

(21) Appl. No.: 16/774,091

(22) Filed: Jan. 28, 2020

(65) Prior Publication Data

US 2020/0240760 A1 Jul. 30, 2020

Related U.S. Application Data

(60) Provisional application No. 62/797,989, filed on Jan. 29, 2019.

(51) Int. Cl.
*F42B 33/06* (2006.01)
*B02C 23/18* (2006.01)
*B60R 21/26* (2011.01)

(52) U.S. Cl.
CPC .............. *F42B 33/06* (2013.01); *B02C 23/18* (2013.01); *B60R 21/26* (2013.01)

(58) Field of Classification Search
CPC ........ F42B 33/06; F42B 33/062; F42B 33/00; F42D 5/04; F42C 15/44
See application file for complete search history.

(56) References Cited

U.S. PATENT DOCUMENTS

| | | | | |
|---|---|---|---|---|
| 1,492,905 A | * | 5/1924 | Swanick ............... | F42B 33/062 134/5 |
| 1,492,922 A | * | 5/1924 | Knight ................. | F42B 33/062 134/5 |
| 1,492,924 A | * | 5/1924 | Knight ................. | F42B 33/062 134/5 |
| 1,492,925 A | * | 5/1924 | Knight ................. | F42B 33/062 134/5 |
| 1,492,949 A | * | 5/1924 | Allison ................ | F42B 33/062 15/304 |
| 1,492,956 A | * | 5/1924 | Bots ...................... | F42B 33/062 134/5 |
| 1,492,957 A | * | 5/1924 | Bots ...................... | F42B 33/062 134/5 |
| 1,516,343 A | * | 11/1924 | Knight ................. | F42B 33/062 134/5 |
| 2,444,045 A | * | 6/1948 | Hoskin ................ | F42B 33/062 86/1.1 |
| 2,491,516 A | * | 12/1949 | Piggot .................... | F42B 33/06 134/24 |

(Continued)

*Primary Examiner* — Derrick R Morgan
(74) *Attorney, Agent, or Firm* — Frost Brown Todd LLC

(57) ABSTRACT

A method is provided for destructively processing an airbag inflator having an outer housing, a propellant housed within the outer housing, and a membrane disposed between the propellant and an inner surface of the outer housing. The method includes rupturing the membrane, exposing the propellant to a liquid, and permitting the propellant to mix with the liquid to form a liquid-propellant mixture. The method may further include removing at least a portion of the liquid from the liquid-propellant mixture to produce an at least partially solidified material that includes the propellant.

19 Claims, 9 Drawing Sheets

(56) References Cited

U.S. PATENT DOCUMENTS

| | | | | |
|---|---|---|---|---|
| 3,782,239 | A * | 1/1974 | Wick | B21D 28/007 |
| | | | | 86/49 |
| 4,081,982 | A * | 4/1978 | Minin | B21D 26/08 |
| | | | | 29/421.2 |
| 4,793,866 | A * | 12/1988 | McIntosh | B08B 9/093 |
| | | | | 134/168 R |
| 5,025,632 | A * | 6/1991 | Spritzer | B09B 3/00 |
| | | | | 241/23 |
| 5,210,368 | A * | 5/1993 | Heller, Jr. | F41A 19/59 |
| | | | | 42/84 |
| 5,714,707 | A * | 2/1998 | Ruia | F42B 33/06 |
| | | | | 86/1.1 |
| 6,080,907 | A * | 6/2000 | Miller | F42B 33/062 |
| | | | | 588/319 |
| 6,245,958 | B1 * | 6/2001 | Morse | F42B 33/06 |
| | | | | 588/318 |
| 6,491,047 | B2 * | 12/2002 | Abe | B08B 9/093 |
| | | | | 134/166 R |
| 7,449,072 | B1 * | 11/2008 | Johnson | B08B 3/12 |
| | | | | 134/1 |
| 2003/0191353 | A1 * | 10/2003 | Scott | A62D 3/20 |
| | | | | 588/316 |
| 2009/0038496 | A1 * | 2/2009 | Maegerlein | F42C 15/38 |
| | | | | 102/222 |
| 2009/0260509 | A1 * | 10/2009 | Asahina | F42B 33/067 |
| | | | | 86/50 |
| 2012/0259149 | A1 * | 10/2012 | Kautz | F41J 13/00 |
| | | | | 588/321 |
| 2014/0323792 | A1 * | 10/2014 | Morris | F42D 5/04 |
| | | | | 588/403 |
| 2015/0241187 | A1 * | 8/2015 | Reid | F42B 33/06 |
| | | | | 86/49 |
| 2020/0408497 | A1 * | 12/2020 | Schmit | F42B 33/062 |

* cited by examiner

SYSTEM AND METHOD FOR DESTRUCTIVELY PROCESSING AIRBAG INFLATORS

PRIORITY

This application claims the benefit of U.S. Provisional Pat. App. No. 62/797,989 entitled "System and Method for Destruction of Airbag Inflators," filed Jan. 29, 2019, the disclosure of which is incorporated by reference herein.

BACKGROUND

Many modern motor vehicles are equipped with passenger airbag safety devices (or simply "airbags") for driver and front passenger seats in compliance with federal motor vehicle safety laws, such as those set forth in the U.S. Intermodal Surface Transportation Efficiency Act of 1991. An airbag assembly generally comprises an inflatable bag and an inflator configured to rapidly direct inflation gas into the inflatable bag in response to a threshold force being detected by a vehicle sensor during a collision. Airbag inflators, such as those manufactured by Takata Corporation of Tokyo, Japan, traditionally comprise a metal body, a chemical propellant housed within the metal body, and an igniter. During a collision, the vehicle sensor sends an electrical signal to the igniter, which then ignites the propellant, causing it to rapidly generate inflation gas. This inflation gas is directed into the inflatable bag to thereby deploy the airbag within the vehicle cabin. Some such inflators house a propellant that comprises ammonium nitrate ($NH_4NO_3$), which ignites to generate inflation gas in the form of nitrogen.

In some instances, it may be desirable to destroy an unignited airbag inflator in a controlled environment so that the inflator is safely rendered inert, and thereafter recycle its components. Moreover, it may be desirable to process such airbag inflators in a manner that complies with standards set by a regulatory agency, such as the U.S. Environmental Protection Agency (EPA), particularly with regard to treatment of the propellant housed within the inflators. While various types of systems and methods for processing automotive components have been made and used, it is believed that no one prior to the inventors has made or used the invention described herein.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
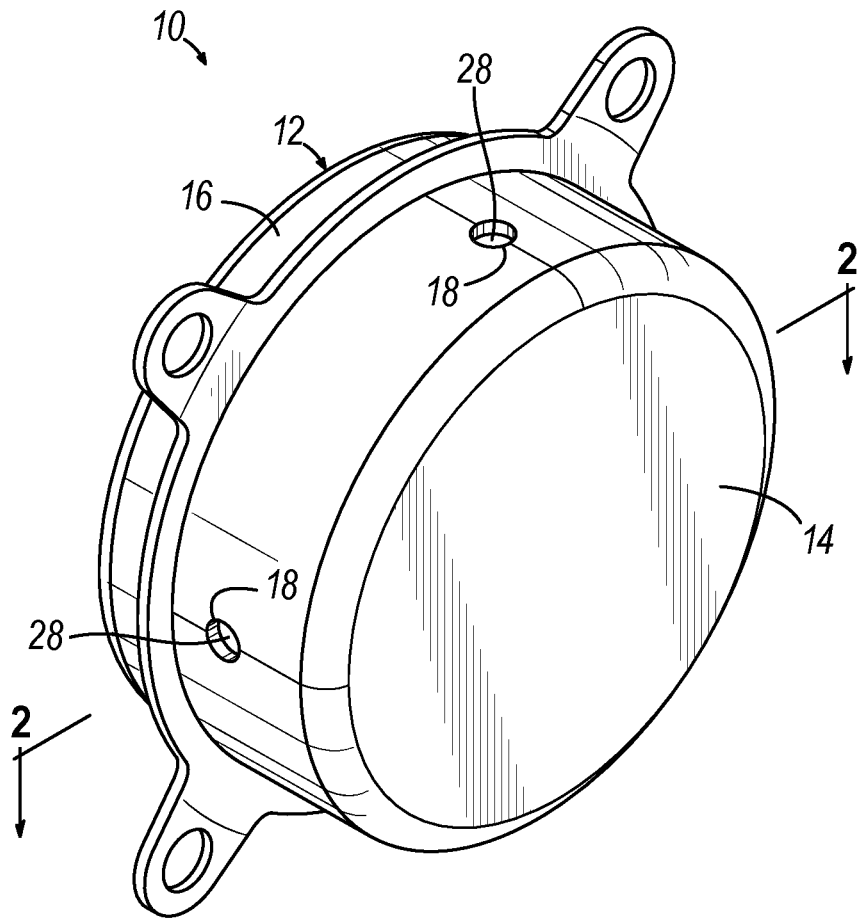
FIG. 1 depicts a perspective view of an exemplary first type of airbag inflator.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As used herein, the terms "about," "approximately," and the like in connection with any numerical values or ranges of values are intended to encompass the exact value(s) referenced, as well as a suitable dimensional tolerance that enables the referenced feature or combination of features to function for the intended purpose described herein.

I. Exemplary Airbag Inflators for Motor Vehicles

Figure 2:
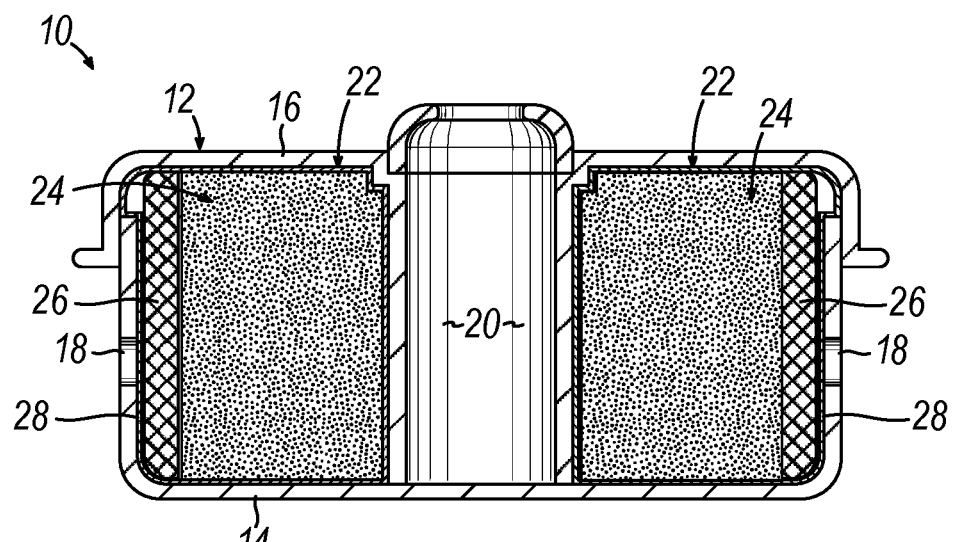
FIG. 2 depicts a cross-sectional view of the airbag inflator of FIG. 1, taken along section line 2-2.

FIGS. 1 and 2 show a first exemplary type of airbag inflator (10) that is generally disc-like in shape and is configured to be positioned within the hub of a steering wheel located on the driver's side of a motor vehicle. Inflator (10) includes an outer housing (12) having a robust construction and including a first housing portion (14) and a second housing portion (16) configured to securely mate together during assembly. Housing portions (14, 16) may be formed of steel, for example. A plurality of apertures (18) are formed in a sidewall of the first housing portion (14) and open to an internal membrane (28) of inflator (10), described below. In the present version, apertures (18) are spaced apart uniformly about an outer circumference of first housing portion (14).

As shown in FIG. 2, first and second housing portions (14, 16) combine to define a cylindrical inner chamber (20) and an annular outer chamber (22) that circumferentially surrounds inner chamber (20). In the present example, cylindrical inner chamber (20) is configured to house an igniter (not shown), and annular outer chamber (22) houses a supply of propellant (24) configured to be ignited by the igniter. Propellant (24) comprises ammonium nitrate and is shown in granular form. An annular filter (26) circumferentially surrounds propellant (24) along an outer wall of outer chamber (22). Filter (26) is shown in the form of a wire mesh structure, which may include a plurality of layers, such as five layers.

Inflator (10) of the present example further includes a membrane (28) that lines the walls of outer chamber (22) and thereby encapsulates filter (26) and propellant (24). In other versions of inflator (10), membrane (28) may be disposed between (e.g., radially between) propellant (24) and one or more inner surfaces of outer housing (12) without fully encapsulating filter (26) and propellant (24) as shown herein. Membrane (28) may comprise a thin layer of metal, such as aluminum, and is configured to be ruptured by rapid outward expansion of gasses within outer chamber (22) when propellant (24) is ignited.

Figure 3:
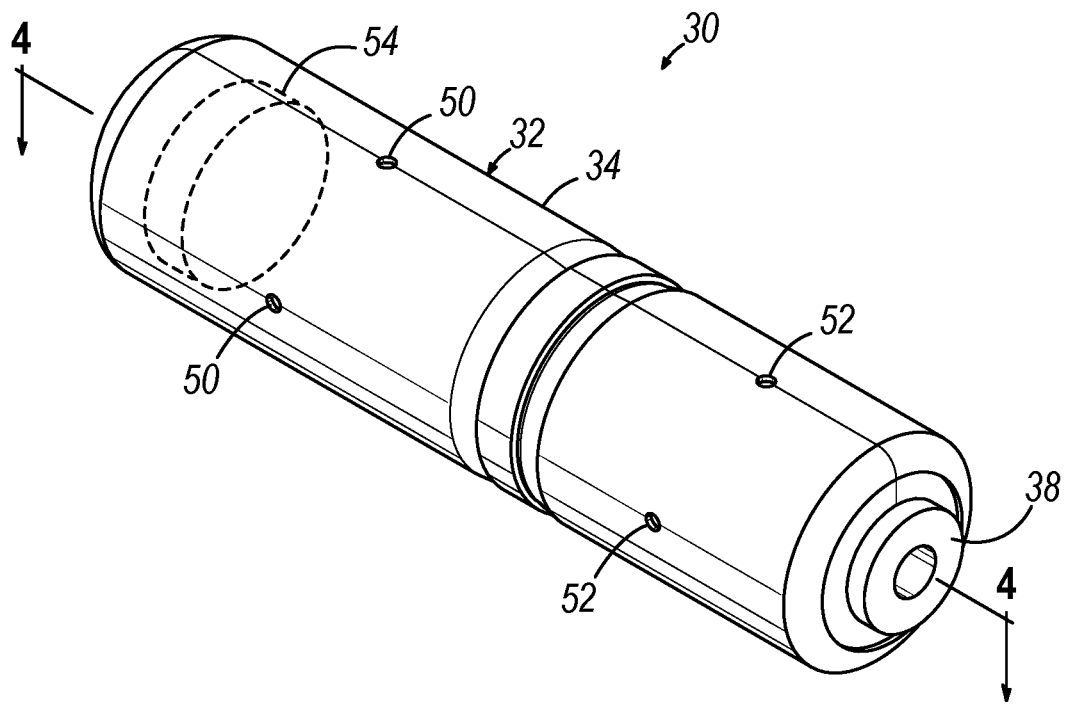
FIG. 3 depicts a perspective view of an exemplary second type of airbag inflator.
Figure 4:
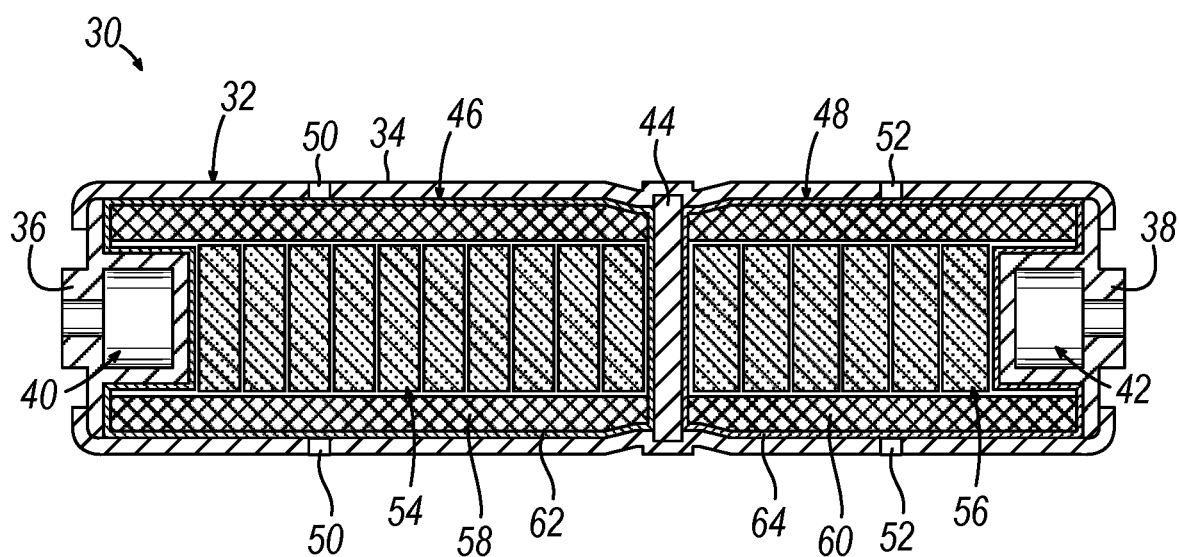
FIG. 4 depicts a cross-sectional view of the airbag inflator of FIG. 3, taken along section 4-4.

FIGS. 3 and 4 show a second exemplary type of airbag inflator (30) that is generally cylindrical in shape and is configured to be positioned in various passenger regions of a motor vehicle. Inflator (30) includes an outer housing (32) having a robust construction and including a cylindrical housing portion (34), a first end plate (36) at a first longitudinal end of inflator (30), and a second end plate (38) at an opposed second longitudinal end of inflator (30). Outer housing (32) may be formed of steel, for example. First end plate (36) defines a first end chamber (40) configured to receive a first igniter (not shown), and second end plate (38) defines a second end chamber (42) configured to receive a second igniter (not shown). An inner plate (44) is housed within cylindrical housing portion (34) and partitions the interior of cylindrical housing portion (34) into a first inner chamber (46) that is closed by first end plate (36), and an opposed second inner chamber (48) that is closed by second end plate (38).

A plurality of first apertures (50) is formed in a first longitudinal portion of cylindrical housing portion (34) that encloses first inner chamber (46); and a plurality of second apertures (52) is formed in a second longitudinal portion of cylindrical housing portion (34) that encloses second inner chamber (48). In the present version, first apertures (50) are spaced apart uniformly about an outer circumference of the first longitudinal portion, and second apertures (52) are spaced apart uniformly about an outer circumference of the second longitudinal portion. First apertures (50) open to a first internal membrane (62) disposed within first inner chamber (46), and second apertures (52) open to a second internal membrane (64) disposed within second inner chamber (48), as described below.

First inner chamber (46) houses a first propellant supply (54) and second inner chamber (48) houses a second propellant supply (56). Propellant (54, 56) comprises ammonium nitrate and is shown in the form of disc-shaped pellets that are stacked along a longitudinal axis of inflator (30) within inner chambers (46, 48). A first cylindrical filter (58) circumferentially surrounds first propellant supply (54) along the inner wall of the first longitudinal portion of cylindrical housing portion (34), and a second cylindrical filter (60) circumferentially surrounds second propellant supply (56) along the inner wall of the second longitudinal portion of cylindrical housing portion (34). Like filter (26), filters (58, 60) are shown in the form of wire mesh structures, each of which may include a plurality of layers.

Inflator (30) further includes a first membrane (62) that lines the inner walls of first inner chamber (46) and thereby encapsulates first filter (58) and first propellant supply (54). Additionally, a second membrane (64) lines the inner walls of second inner chamber (48) and thereby encapsulates second filter (60) and second propellant supply (56). In other versions of inflator (30), first membrane (62) may be disposed between (e.g., radially between) first propellant supply (54) and a corresponding inner surface of cylindrical housing portion (34) without fully encapsulating first propellant supply (54) and first filter (58). Similarly, in other such versions, second membrane (64) may be disposed between (e.g., radially between) second propellant supply (56) and a corresponding inner surface of cylindrical housing portion (34) without fully encapsulating second propellant supply (56) and second filter (60). Similar to membrane (28), each membrane (62, 64) may comprise a thin layer of metal, such as aluminum, and is configured to be ruptured by rapid outward expansion of gasses within the respective inner chamber (46, 48) when propellant (54, 56) is ignited.

Inflators (10, 30) may include a variety of additional and/or alternative features not shown or described herein, as will be apparent to persons of ordinary skill in the art in view of the teachings herein.

II. Exemplary Methods for Destructively Processing Airbag Inflators

As described above, it may be desirable to destroy airbag inflators that have in a safe manner while complying with certain regulatory standards. The exemplary systems (100, 200, 310) and corresponding methods described below provide for safe destructive processing of airbag inflators, such as inflators (10, 30) described above, while maximizing the portion of each destroyed inflator that is rendered suitable for recycling. Advantageously, systems (100, 200, 310) thus provide for safe and efficient destruction and recycling of such airbag inflators.

It will be appreciated that each system (100, 200, 310) described below may be utilized to process unignited versions of airbag inflators (10, 30) described above, as well as various other types of airbag inflators in which a chemical propellant (e.g., ammonium nitrate) is housed within a metal body. It will be further appreciated that any one or more of systems (100, 200, 310) may be utilized to process various other similarly constructed items produced within or beyond the automotive industry.

A. Exemplary Processing Method Using Shredding Unit

Figure 5:
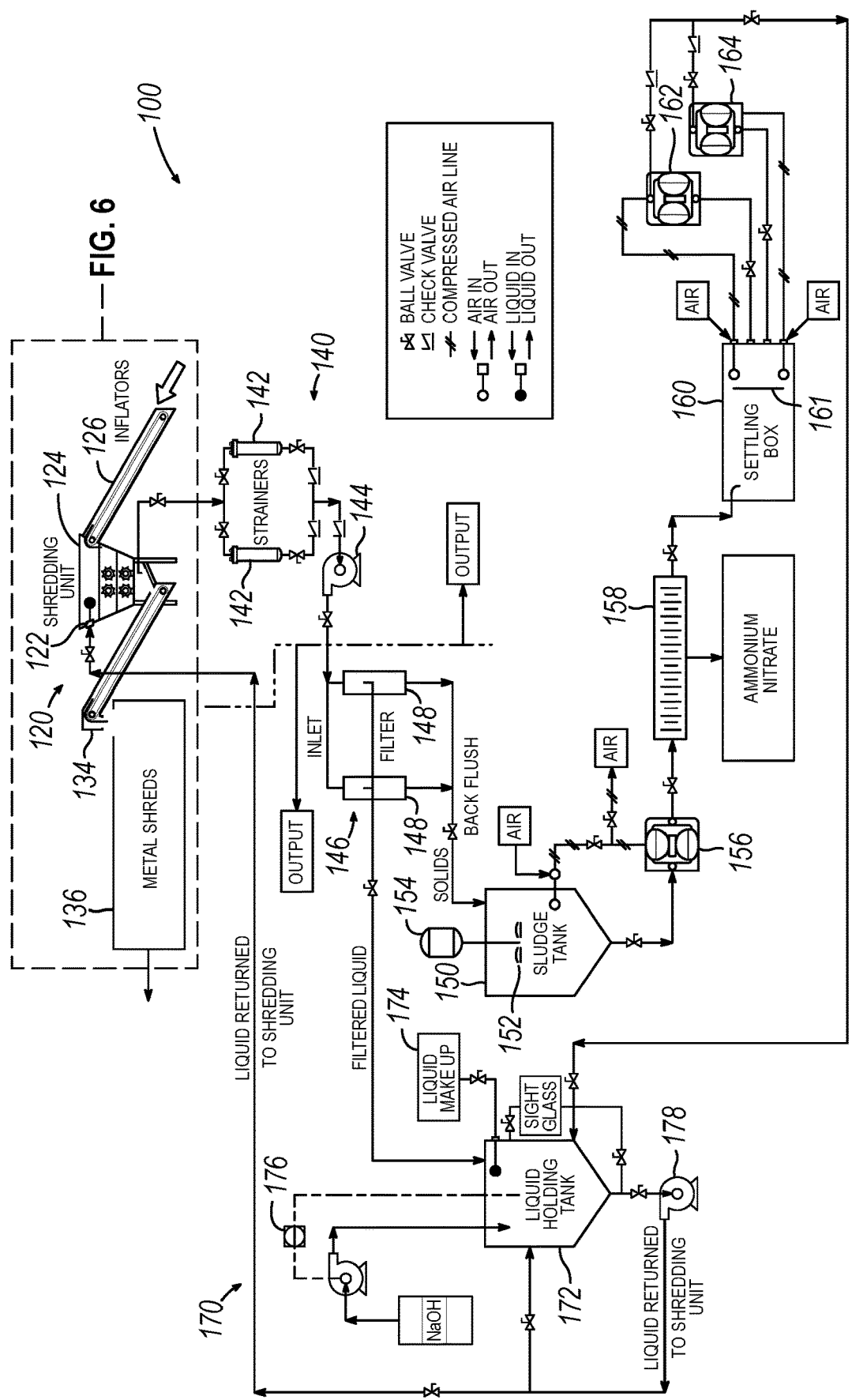
FIG. 5 depicts a schematic diagram showing an exemplary system for destructively processing airbag inflators.

As shown in FIG. 5, airbag inflator processing system (100) includes an airbag inflator destruction unit in the form of a shredding unit (120) (or "shredder"), a filtration circuit (140) downstream of shredding unit (120), and a clean liquid recirculation circuit (170) that fluidly couples multiple liquid outlets of filtration circuit (140) with a clean liquid inlet (122) of shredding unit (120), as described in greater detail below. In the present example, processing system (100) includes a network of liquid conveying conduit that defines and interconnects filtration circuit (140) with clean liquid recirculation circuit (170), for example. In the present version, at least a portion of such conduit is in the form of piping having an inner diameter of approximately two inches in order to achieve optimal internal pressures and flow rates within system (100). In other versions of system (100), such conduit may be alternatively sized as desired to achieve a desired internal pressure and flow rate in a selected one or more portions of system (100).

Figure 6:
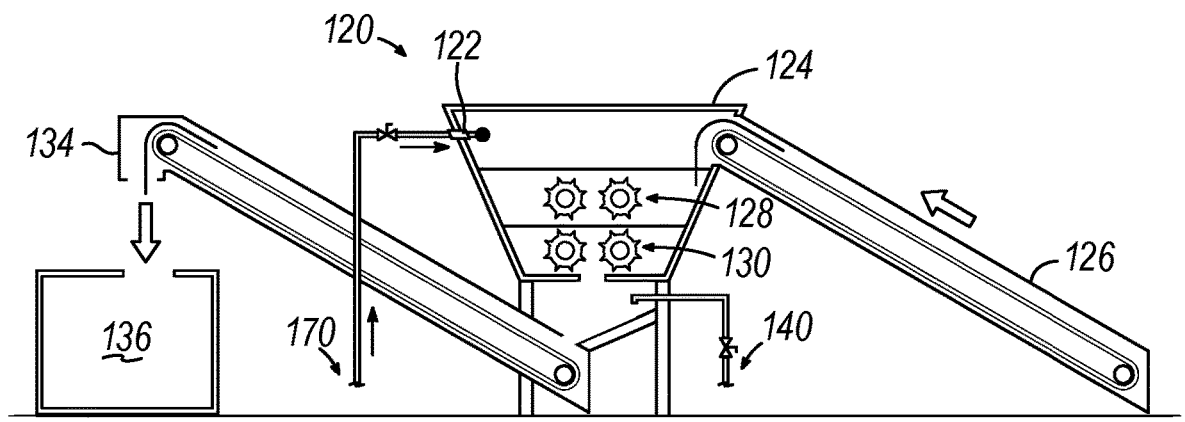
FIG. 6 depicts a schematic side view of a shredding unit of the system of FIG. 5.
Figure 7:
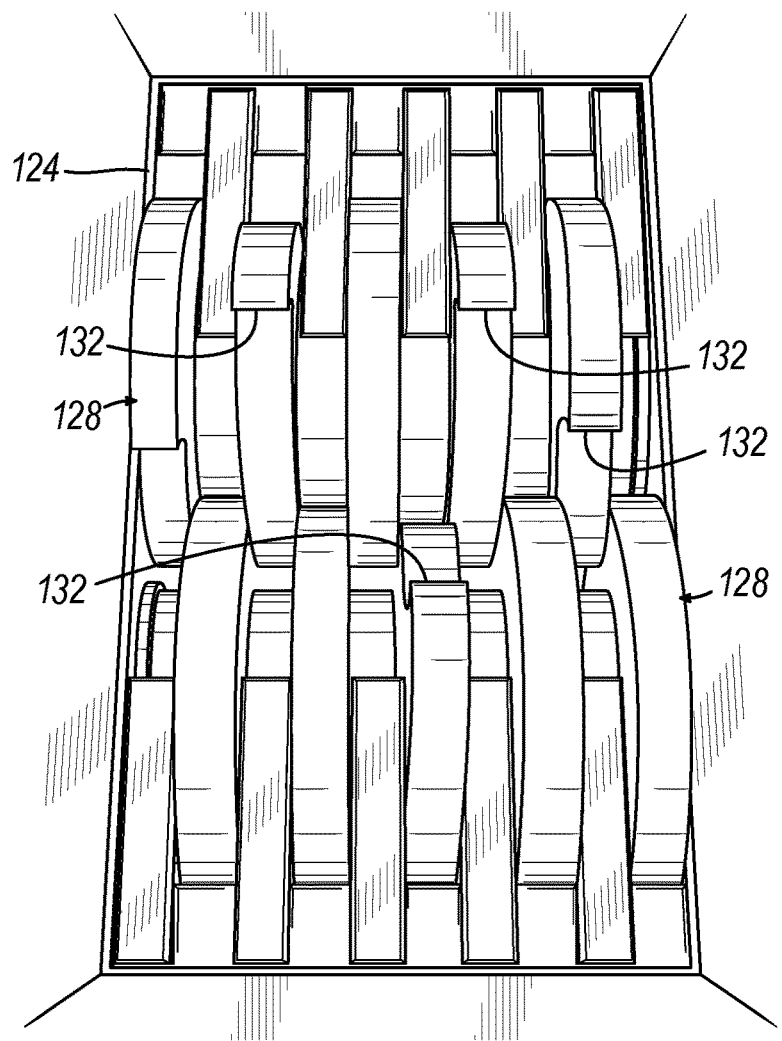
FIG. 7 depicts an isometric view of an upper infeed portion of the shredding unit of FIG. 6, showing a pair of upper cutting shafts positioned at the base of an infeed hopper.

As shown in FIGS. 5-7, an upper portion of shredding unit (120) defines an infeed hopper (124) that receives a supply of airbag inflators from an infeed conveyor (126). In some instances, infeed conveyor (126) may be operable to deliver airbag inflators to infeed hopper (124) at a feed rate of up to approximately 800 inflators per hour. As shown best in FIGS. 5 and 6, infeed hopper (124) of shredding unit (120) opens to a tier of upper cutting shafts (128) that define a first shredding portion of shredding unit (120). A tier of lower cutting shafts (130) is spaced vertically beneath upper cutting shafts (128) and defines a second shredding portion of shredding unit (120). In the present version, shredding unit (120) includes a pair of upper cutting shafts (128) extending generally parallel to one another, and a pair of lower cutting shafts (130) extending generally parallel to one another and to upper cutting shafts (128). In other versions of shredding unit (120), various alternative quantities and configurations of upper and lower cuttings shafts (128, 130) may be provided. Moreover, upper cutting shafts (128) may be configured similarly to or differently from lower cutting shafts (130).

As shown in FIG. 7, each cutting shaft (128, 130) includes a plurality of blades (132) spaced longitudinally along the shaft (128, 130). Each pair of cutting shafts (128, 130) is configured to rotate in opposing directions so that blades (132) of each cutting shaft (128, 130) rotatably mesh with blades (132) of the adjacent cutting shaft (128, 130). When a supply of airbag inflators is directed downwardly into infeed hopper (124), upper cutting shafts (128) rotate toward one another to pull the airbag inflators downwardly between upper cutting shafts (128) and thereby disfigure the airbag inflators via shredding with blades (132). After passing downwardly through the upper cutting shafts (128), the partially shredded airbag inflators are engaged by and pulled downwardly between lower cutting shafts (130) in a similar manner, thereby further shredding the airbag inflators. In this manner, shredding unit (120) shreds apart the various metal components of each airbag inflator, including the outer housing and internal filter(s). In doing so, shredding unit (120) ruptures the internal membrane(s) of each airbag inflator (e.g., membranes (28, 62, 64) of inflators (10, 30) described above), thereby releasing the housed propellant from the inflators and into a supply of liquid present within shredding unit (120), as described in greater detail below.

In the present version, upper and lower cutting shafts (128, 130) are configured to cooperate to reduce the metal components of the airbag inflators to pieces having a maximum dimension of approximately ⅝" inches or smaller. Shredding unit (120) may be configured to shred the airbag inflators at a rate of approximately 24 inflators per minute in a submerged environment, as described in greater detail below. It will be appreciated that providing multiple sequential stages of shredding, via upper and lower cutting shafts (128, 130), provides optimal destruction of the supplied airbag inflators and separation of the propellant from the shredded metal components. As shown in FIGS. 5 and 6, a metal discharge mechanism (134) receives the shredded metal pieces from lower cutting shafts (130) and directs the shredded metal pieces into a container (136), for example via use of an augur. Container (136) may then be transported to a separate location for recycling of the shredded metal pieces.

Shredding unit (120) of the present version is configured to contain a liquid, which may comprise water, in sufficient volume such that upper and lower cutting shafts (130), as well as the airbag inflators being shredder, are fully submerged in the liquid throughout the shredding process described above. In the present version, shredding unit (120) is configured to contain approximately 100 gallons of liquid. As airbag inflators are shredded by cutting shafts (128, 130), the propellant (e.g., ammonium nitrate) released from the internal chambers of the airbag inflators mixes with the liquid present within shredding unit (120) to form a liquid-propellant mixture.

As shown in FIG. 5, the liquid-propellant mixture is discharged from shredding unit (120) through a liquid outlet and is directed through filtration circuit (140) to separate the propellant from the liquid so the propellant may be recycled. More specifically, from shredding unit (120), the liquid-propellant mixture is directed downstream through a straining unit shown in the form of a pair of basket strainers (142), which are arranged in parallel in the present version. Upon exiting basket strainers (142), the liquid-propellant mixture is directed further downstream by a centrifugal pump (144) to a filter unit (146). Filter unit (146) then thickens the liquid-propellant mixture by removing liquid to yield a solid content in the range of approximately 15% to approximately 20%. Filter unit (146) of the present version comprises a pair of disc filters (148) and may be in the form of a TURBO DISC unit made available by Miller Leaman of Daytona Beach, Fla., for example.

The thickened liquid-propellant mixture (also referred to as a "slurry") discharged from filter unit (146) passes further downstream to a sludge tank (150), which may have an internal volume of approximately 350 gallons, for example. An agitator (152) positioned within sludge tank (150) is rotatably driven by a motor (154) to agitate the thickened liquid-propellant mixture to prevent premature solidification of the mixture within sludge tank (150). The thickened mixture is then directed from an outlet of sludge tank (150) to a filter press (158) by a diaphragm pump (156), which may be activated automatically in response to an input provided by a sensor, switch, controller, or any other suitable input mechanism, or manually by an operator.

Filter press (158) may be in the form of a plate and frame filter press and is configured to remove additional liquid from the received liquid-propellant mixture to produce a semi-solid material having a moisture content in the range of approximately 30% to approximately 50%; and more specifically, in the range of approximately 30% to approximately 40%. The semi-solid material (also referred to as "filter cake") contains the propellant extracted from the airbag inflators during the shredding process. Accordingly, the semi-solid material may be recycled to thereby repurpose the propellant contained therein. In instances in which the propellant comprises ammonium nitrate, the semi-solid material may be repurposed as high-quality fertilizer, for example.

As shown in FIG. 5, liquid extracted from the thickened liquid-propellant mixture by filter press (158) is directed into a settling box (160), which may include an internal baffle (161) and enables any solid materials remaining in the liquid to settle. The resulting clean liquid (e.g., clean water) produced by the settling process is directed by a pair of pumps shown in the form of diaphragm pumps (162, 164) to a liquid holding tank (172) of clean liquid recirculation circuit (170). Liquid holding tank (172), which may have an internal volume of approximately 500 gallons, is configured to receive additional clean liquid from other sources of system (100), such as a filtered liquid outlet of filter unit (146) and a make-up liquid source (174). A pH controller (176) may communicate with liquid holding tank (172) to regulate a pH level of the liquid contained therein. A centrifugal pump (178) is configured to circulate clean liquid from holding tank (172) back to clean liquid inlet (122) of shredding unit (120), such that a fresh supply of liquid is maintained in the shredding unit (120) so that cutting shafts (128, 130) and the airbag inflators remain submerged throughout the ongoing shredding process. It will be appreciated that shredding unit (120), filtration circuit (140), and clean liquid recirculation circuit (170) may each operate continuously in the manners described above, such that liquid is constantly flowing throughout system (100) to facilitate efficient production of semi-solid material containing the propellant for recycling.

B. Exemplary Processing Method Using Pulverizer

Figure 8:
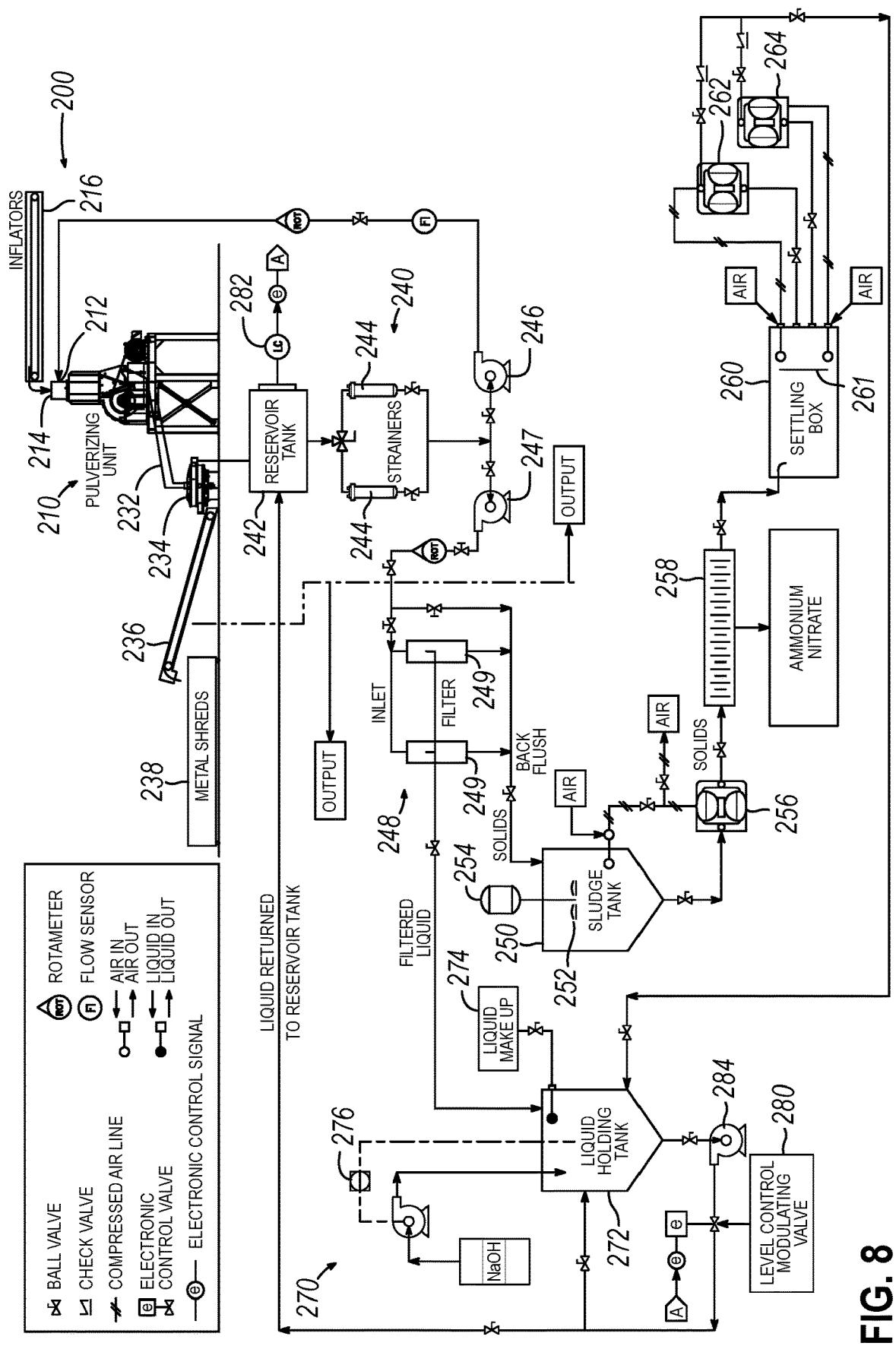
FIG. 8 depicts a schematic diagram showing another exemplary system for destructively processing airbag inflators.

In some instances, it may be desirable to use an alternative mechanism in place of shredding unit (120) described above to break apart airbag inflators and release the propellant contained therein. In that regard, FIG. 8 shows another exemplary airbag inflator processing system (200) configured to destructively process unignited airbag inflators, such as inflators (10, 30) described above and variations thereof. It will be understood that system (200) is similar in structure and function to system (100) described above, except as otherwise described below in connection with FIGS. 8-10.

Airbag inflator processing system (200) includes an airbag inflator destruction unit in the form of a ringmill pulverizer (210), a filtration circuit (240) downstream of pulverizer (210), and a clean liquid recirculation circuit (270) that fluidly couples multiple liquid outlets of filtration circuit (240) with a clean liquid inlet (212) of pulverizer (210). In some versions, pulverizer (210) may be of a type made available by American Pulverizer Company of St. Louis, Mo. Like shredding unit (120) of system (100), pulverizer (210) is configured to disfigure and destroy airbag inflators in the presence of a liquid, such as water, so that the propellant housed within the inflators is released into the liquid to create a liquid-propellant mixture, which is the treated by filtration circuit (240), as described in greater detail below.

Figure 9:
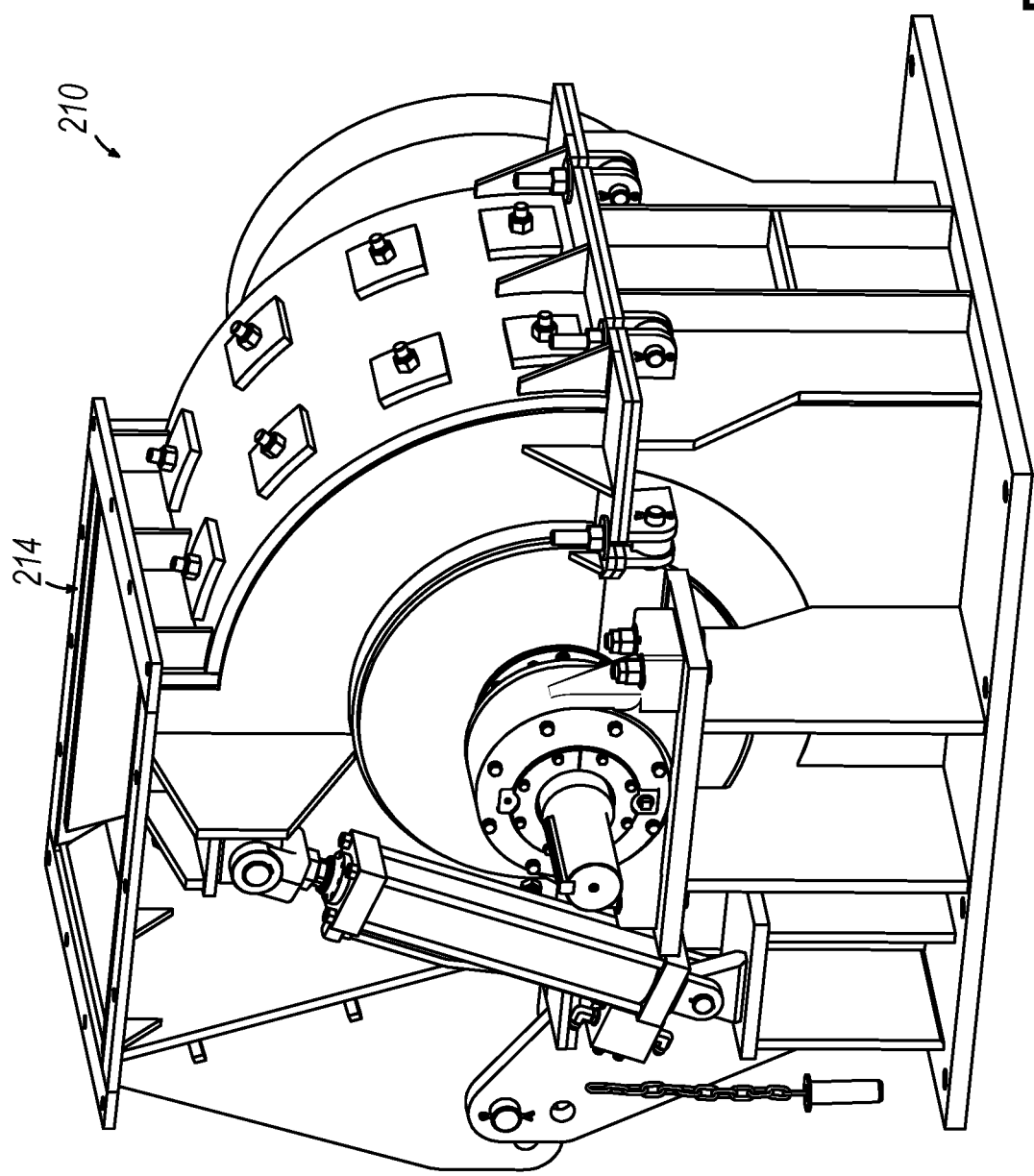
FIG. 9 depicts a perspective view of a pulverizing unit of the system of FIG. 8.
Figure 10:
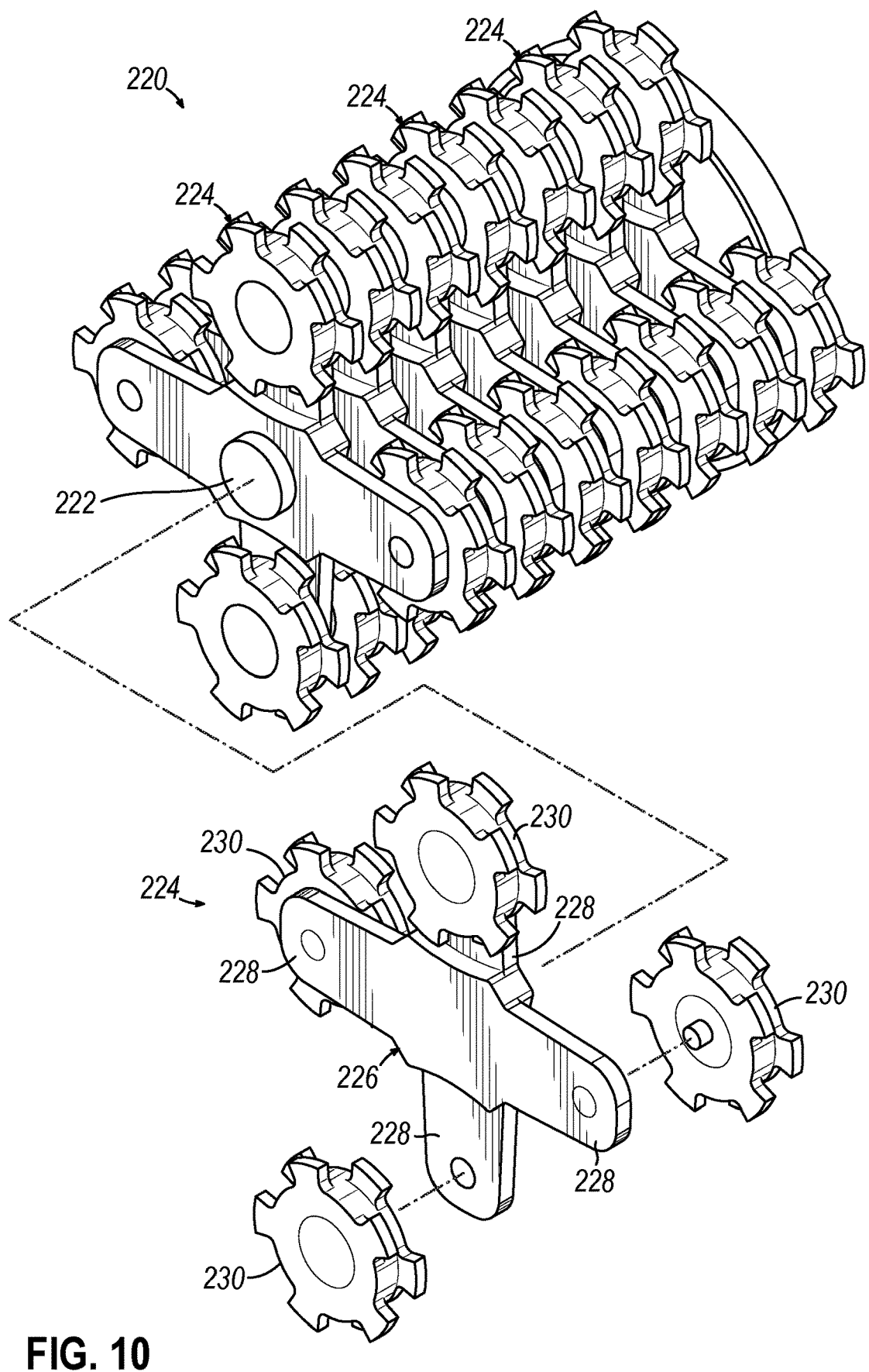
FIG. 10 depicts a partially disassembled perspective view of a rotor assembly of the pulverizing unit of FIG. 9.

As shown in FIGS. 9, an upper portion of ringmill pulverizer (210) includes an infeed hopper (214) that receives a supply of airbag inflators from an infeed conveyor (216). In some versions, infeed conveyor (216) may be operable to deliver airbag inflators to infeed hopper (214) at a feed rate of up to approximately 1620 inflators per hour. An internal pulverizing chamber (not shown) of ringmill pulverizer (210) rotatably houses a rotor assembly (220), shown in FIG. 10. Rotor assembly (220) includes a central shaft (222) and a plurality of pulverizing members (224) arranged axially along central shaft (222). Each pulverizing member (224) includes a hub (226) having a plurality of arms (228), and a plurality of pulverizing rings (230) rotatably disposed at the outer radial ends of arms (228). In the present version, each hub (226) includes four arms (228) and four pulverizing rings (230) spaced apart in 90 degree increments. It will be appreciated that various alternative configurations of rotor assembly (220) may be utilized in other versions of pulverizer (210).

During operation, the internal pulverizing chamber of ringmill pulverizer (210) receives a flow of liquid, such as water, from liquid inlet (212). In some instances, the liquid may be supplied at a rate of approximately 20 gallons per minute to approximately 80 gallons per minute. As rotor assembly (220) is rotatably driven within the internal chamber by a motor (not shown), the inflators are drawn in from infeed hopper (214) and are disfigured via pulverizing by pulverizing rings (230) against interior surfaces of the pulverizing chamber, in the presence of the liquid, thus producing small shreds of metal. During this process, pulverizer (210) ruptures the internal membrane(s) of each inflator (e.g., membranes (28, 62, 64) of inflators (10, 30) described above), thereby releasing the propellant from the inflators and into the liquid, thus enabling the liquid and the released propellant to mix together to form a liquid-propellant mixture. In some instances, as is also the case with system (100) described above, at least some of the propellant may dissolve into the liquid such that at least a portion of the resulting liquid-propellant mixture is in the form of a solution.

As shown in FIG. 8, the metal shreds and liquid-propellant mixture created within the pulverizing chamber of ringmill pulverizer (210) are discharged through an outlet conduit (232) into a vibrating screen (234). Vibrating screen (234) is operable to separate the metal shards from the liquid-propellant mixture. The metal shreds are then directed by a conveyor (236) into a dedicated container (238) so that the metal shreds may then be recycled. The liquid-propellant mixture is then directed through filtration circuit (240) to remove liquid from the mixture to produce an at least partially solidified material that includes the propellant, so that the propellant may be recycled independently from the metal shreds.

In particular, the liquid-propellant mixture is first directed from vibrating screen (234) into a reservoir tank (242), which may have an internal volume of approximately 200 gallons, for example. From reservoir tank (242), the liquid-propellant mixture is directed downstream through a straining unit shown in the form of a pair of basket strainers (244). From basket strainers (244), a first portion of the strained liquid-propellant mixture is recirculated back to liquid inlet (212) of pulverizer (210) by centrifugal pump (246), thus providing the flooded environment in which the airbag inflators are pulverized. A second portion of the strained liquid-propellant mixture exiting strainers (244) is directed further downstream by centrifugal pump (247) to a filter unit (248). Like filter unit (146) of system (100), filter unit (248) thickens the liquid-propellant mixture by removing liquid to yield a solid content in the range of approximately 15% to approximately 20%. Additionally, filter unit (248) of the present version comprises a pair of disc filters (249) similar to disc filters (148) of system (100).

The thickened liquid-propellant mixture (or "slurry") discharged from filter unit (146) passes further downstream to a sludge tank (250), which may be similar to sludge tank (150) of system (100) and include an agitator (252) driven by a motor (254). The thickened mixture within the sludge tank (250) is then directed by a diaphragm pump (256) to a filter press (258). Filter press (258) may be similar to filter press (158) of system (100) and is configured to remove additional liquid from the thickened liquid-propellant mixture to produce a semi-solid material (or "filter cake") having a moisture content in the range of approximately 30% to approximately 50%; and more specifically, in the range of approximately 30% to approximately 40%. The semi-solid material may be recycled to thereby repurpose the propellant (e.g., ammonium nitrate) contained therein.

As shown in FIG. 8, liquid extracted from the thickened liquid-propellant mixture by filter press (258) is directed into a settling box (260), which may include an internal baffle (261) similar to settling box (160) of system (100). The resulting clean liquid (e.g., clean water) produced by the settling process is directed by a pair of diaphragm pumps (262, 264) to a liquid holding tank (272) of clean liquid recirculation circuit (270). Liquid holding tank (272) may be similar to liquid holding tank (170) of system (100) and is configured to receive additional clean liquid from other sources of system (200), such as a filtered liquid outlet of filter unit (248) and a make-up liquid source (274). A pH controller (276) may communicate with liquid holding tank (272) to regulate a pH level of the liquid contained therein.

In the present version of clean liquid recirculation circuit (270), a level control modulating valve (280) is positioned downstream of an outlet of liquid holding tank (272) and is in electric communication with an LC sensor (282) coupled with reservoir tank (242). In response to an electronic control signal received from LC sensor (282), modulating valve (280) opens to permit circulation of clean liquid from liquid holding tank (272) back to reservoir tank (242) by a centrifugal pump (284). Within reservoir tank (242), the recirculated clean liquid then mixes with the liquid-propellant mixture received from vibrating screen (234) before being directed downstream again through strainers (244) for a repeat of filtration circuit (240). In that regard, and similar to system (100) described above, pulverizer (210), filtration circuit (240), and clean liquid recirculation circuit (270) may each operate continuously in the manners described above such that liquid is constantly flowing throughout system (200) to facilitate efficient production of semi-solid material containing the propellant for recycling.

C. Exemplary Processing Method Using Membrane Puncture at Discrete Locations

In some instances, it may be desirable to extract propellant from the internal chamber(s) of an airbag inflator by a method that does not require the labor-intensive step of physically breaking apart the outer housing of the inflator. As described above in connection with the exemplary airbag inflators (10, 30) shown in FIGS. 1-4, each type of inflator (10, 30) includes a plurality of pre-formed apertures (18, 50, 52) formed in its outer housing (12, 32) and which open to the internal membrane(s) (28, 62, 64) that encapsulates the housed propellant (24, 54, 56). The exemplary alternative method described below in connection with FIGS. 11A-11C takes advantage of these pre-formed apertures (18, 50, 52) to extract propellant (24, 54, 56) from inflators (10, 30) without first having to physically destroy the outer housing (12, 32) with a costly destruction unit, such as shredder (120) or pulverizer (210) described above.

Figure 11A:
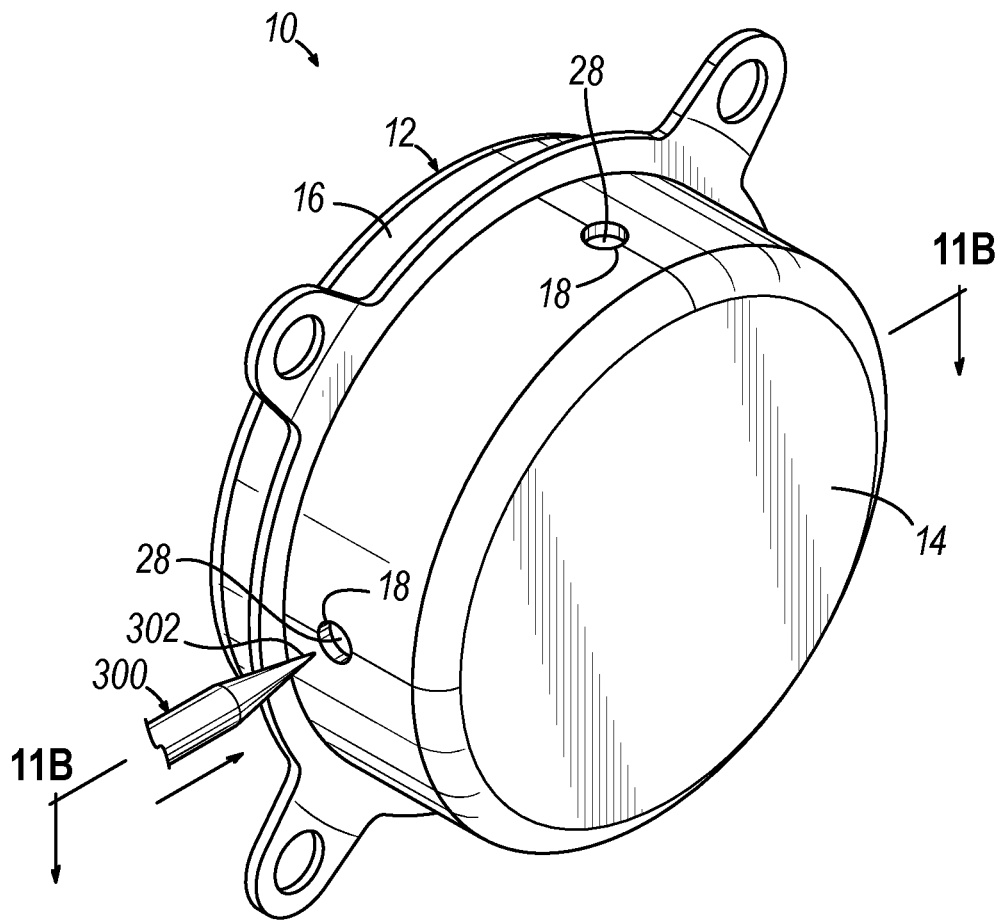
FIG. 11A depicts a perspective view of the airbag inflator of FIG. 1, showing an exemplary first step of a method for destructively processing the airbag inflator using an exemplary alternative system shown in FIG. 11C.
Figure 11B:
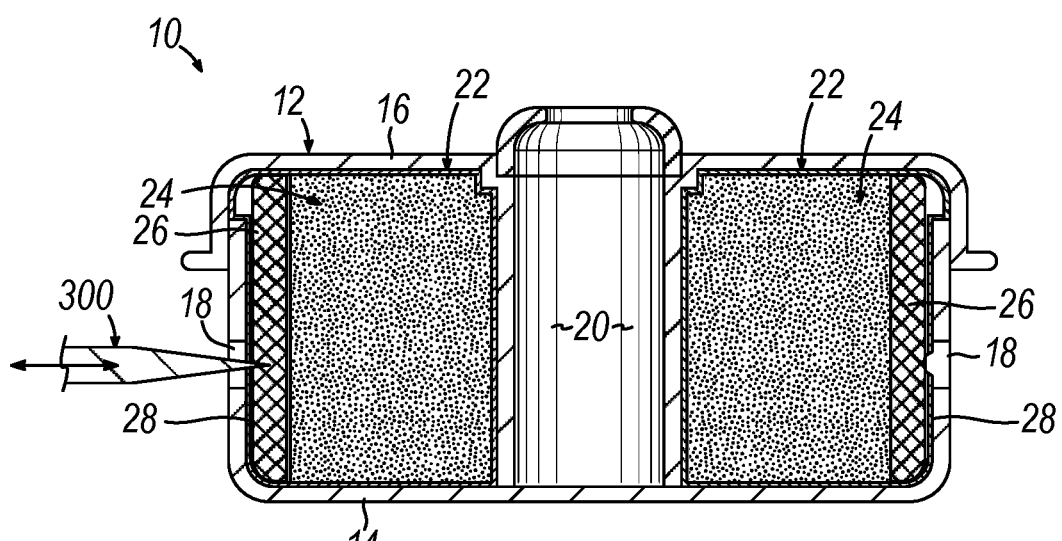
FIG. 11B depicts a cross-sectional view of the airbag inflator of FIG. 11A, taken along section line 11A-11A, showing an exemplary second step of the method for destructively processing the airbag inflator using the alternative system of FIG. 11C.
Figure 11C:
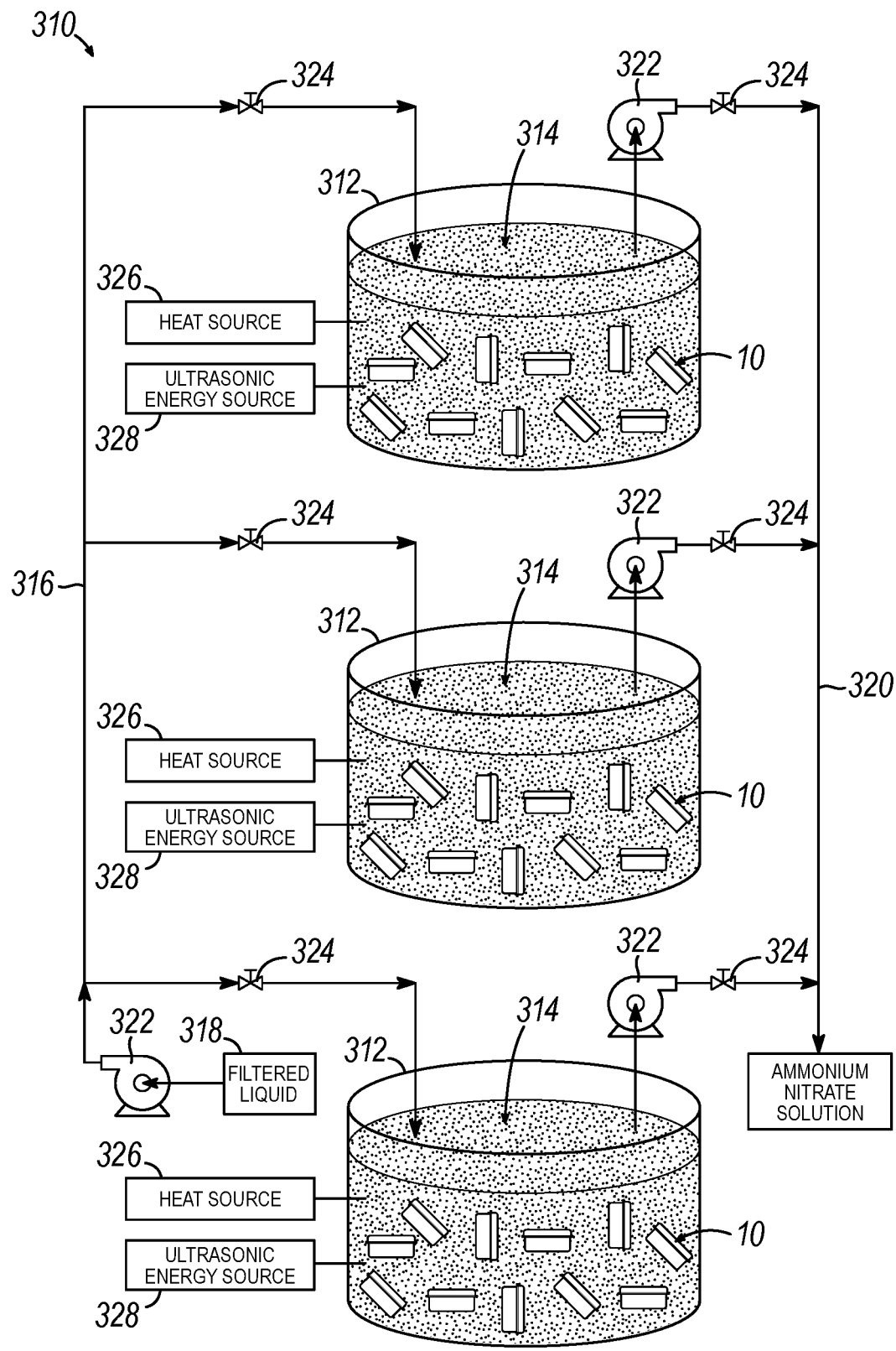
FIG. 11C depicts a schematic view of the exemplary alternative system, showing an exemplary third step of the method for destructively processing a plurality of airbag inflators using the alternative system.

The exemplary steps and system of FIGS. 11A-11C are shown and described below in connection with processing batches of airbag inflator (10). However, it will be appreciated that these steps and system may be utilized in a similar manner to process airbag inflators of various other configurations having an outer housing with pre-formed apertures, a supply of propellant housed therein, and an internal membrane accessible via the apertures. Additionally, though not shown, it will be appreciated that one or more additional apertures or other openings may be formed manually in the outer housing of an inflator, such as with a drilling tool or an awl, to facilitate the process described below.

FIGS. 11A and 11B show an initial set of steps of the exemplary process introduced above. As shown, an exemplary puncturing tool (300), which may be in the form of an awl, having a pointed distal tip (302) is directed inwardly through each aperture (18) of outer housing (12) to puncture (i.e., rupture) internal membrane (28) at a discrete location aligned with aperture (18). Membrane (28) may be punctured in this manner at three or more discrete locations, for example, depending on the quantity of apertures (18) formed in outer housing (12). The resulting openings formed in membrane (28) expose propellant (24) to the ambient environment through filter (26), which has a gas/liquid-permeable construction as described above. Filter (26) itself is not punctured in the present example, though filter (26) may be partially or fully punctured in other examples. While puncturing of membrane (28) is shown being performed with puncturing tool (300) in the present example, such puncturing of membrane (28) may be performed using a variety of other tools and methods readily apparent to those of ordinary skill in the art in view of the teachings herein. In some versions, such puncturing may be performed manually by hand, without the assistance of automated machinery. In other versions, automated machinery may be utilized in the puncturing process to increase throughput.

FIG. 11C shows an exemplary tank system (310) in which airbag inflators (10) having punctured internal membranes (28) are configured to be placed for extraction of propellant (24), as described in great detail below. Tank system (310) of the present example includes a plurality of dip tanks (312) each containing a bath of liquid (314), which may comprise water. Each dip tank (312) is fluidly coupled with a system supply line (316) that continuously supplies clean liquid (314) to tank (312) from a clean liquid source (318); and a system outlet line (320) that continuously withdraws liquid-propellant solution from tank (312) for subsequent filtering. System (310) further includes a plurality of controllable liquid pumps (322) and valves (324) that control the continuous flow of clean liquid and liquid-propellant solution through system (310). It will be appreciated that the illustrated quantities and arrangement of dip tanks (312), supply line (316), outlet line (320), pumps (322), and valves (324) are merely exemplary, and that various other suitable quantities and arrangements of these system components may be provided in other versions of tank system (310).

In use, when an airbag inflator (10) having a punctured internal membrane (28) is positioned within a dip tank (312), liquid (314) enters the apertures (18) and passes inwardly through the puncture openings formed in membrane (28) and through filter (26) to reach propellant (24). Prolonged soaking of the inflator (10) within liquid (314) enables propellant (24) to fully dissolve into the ambient liquid (314) and thus create a liquid-propellant solution within dip tank (312). In some applications, each punctured inflator (10) may be allowed to soak within a dip tank (312) for approximately two to four hours to achieve full dissolution of propellant (24) into liquid (314).

Optionally, in some versions of tank system (310), a heat source (326) and/or an ultrasonic energy source (328) may be applied to liquid (314) in each dip tank (312) to accelerate the propellant dissolution process. In that regard, it will be understood that the solubility of propellant (24), as a salt, naturally increases as the temperature of the ambient liquid (314) (e.g., water) increases. For instance, it has been found that ammonium nitrate propellant has a water solubility of approximately 1.8 pounds to 1 gallon of water (1.8:1) at an ambient room temperature of approximately 70 degrees Fahrenheit; and which may increase in response to application of heat. By way of example only, liquid (314) may be heated to a temperature of approximately 110 degrees Fahrenheit. In some instances, heat may be applied to liquid (314) before it reaches dip tanks (312), such as within a portion of system supply line (316), so that liquid (314) is in a heated stated (i.e., above room temperature) upon entering dip tanks (312).

Additionally, it will be understood that application of ultrasonic energy to liquid (314) within tip tank (312) creates cavitation within liquid (314), which agitates the undissolved propellant (24) and thereby separately accelerates dissolution of the propellant (24) into liquid (314). By way of example only, ultrasonic energy sources (328) may be configured to apply ultrasonic energy to liquid (314) with a frequency of approximately 20 kHz to approximately 500 kHz, such as approximately 60 kHz. In some examples, application of heat and/or ultrasonic energy to the liquid (314) within dip tanks (312) may yield complete dissolution of an inflator's propellant (24) into liquid (314) in 30 minutes or less, such as approximately 20 minutes.

Following complete dissolution of propellant into the liquid (314), inflators (10) may be removed from dip tanks (312) and any residual liquid-propellant solution trapped therein may be permitted to drain out, thus leaving behind empty metal outer housings (12) now devoid of propellant (24) and rendered inert and safe to recycle, along with their remaining internal components including filter (26). In some instances, outer housings (12) may still be shredded, pulverized, or otherwise disfigured in any suitable manner onsite following their removal from dip tanks (312), for example to ensure that outer housings (12) are not confused with other inflators (10) still containing propellant (24), or otherwise repurposed by other parties in any illegitimate remanufacturing efforts.

The liquid-propellant solution present within dip tanks (312) as a result of the propellant dissolution process described above is directed continuously out of tanks (312) through system outlet line (320). The solution may then be directed through a liquid-solids separation system to create a semi-solid, cake type material containing propellant (24), such that propellant (24) may be recycled separately from outer housings (12). In particular, though not shown, tank system (310) may be coupled with suitable portions of systems (100, 200) described above, or adaptations thereof, to create such a recyclable, propellant-containing material, while also recycling liquid (314) extracted from the solution for reuse in dip tanks (312). In this manner, unignited airbag inflators (10) may be safely and effectively recycled with optimal efficiency and minimal operating costs.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A method of destructively processing an airbag inflator having an outer housing, a propellant housed within the outer housing, and a membrane disposed between the propellant and an inner surface of the outer housing, the method comprising: (a) rupturing the membrane; (b) exposing the propellant to a liquid; and (c) permitting the propellant to mix with the liquid to form a liquid-propellant mixture.

EXAMPLE 2

The method of Example 1, wherein the propellant comprises ammonium nitrate.

EXAMPLE 3

The method of any of the preceding Examples, further comprising removing at least a portion of the liquid from the liquid-propellant mixture.

EXAMPLE 4

The method of any of Example 3, wherein removing at least a portion of the liquid from the liquid-propellant mixture includes producing an at least partially solidified material that includes the propellant.

EXAMPLE 5

The method of Example 4, wherein the at least partially solidified material has a moisture content less than or equal to 50%.

EXAMPLE 6

The method of any of the preceding Examples, wherein the outer housing includes at least one aperture that opens to the membrane, wherein rupturing the membrane includes puncturing the membrane through the at least one aperture.

EXAMPLE 7

The method of Example 6, wherein the at least one aperture includes a plurality of apertures, wherein rupturing the membrane includes puncturing the membrane at discrete locations through the apertures.

EXAMPLE 8

The method of Example 7, wherein the apertures are spaced apart about a circumference of the outer housing.

EXAMPLE 9

The method of any of the preceding Examples, wherein exposing the propellant to the liquid includes positioning the airbag inflator having the ruptured membrane within a liquid bath.

EXAMPLE 10

The method of any of the preceding Examples, wherein permitting the propellant to mix with the liquid includes permitting the propellant to at least partially dissolve into the liquid to create a liquid-propellant solution.

EXAMPLE 11

The method Example 10, further comprising applying at least one of heat or ultrasonic energy to the liquid bath to accelerate dissolution of the propellant into the liquid.

EXAMPLE 12

The method of any of the preceding Examples, wherein rupturing the membrane includes disfiguring the outer housing and thereby releasing the propellant from the outer housing.

EXAMPLE 13

The method of Example 12, wherein disfiguring the outer housing includes at least one of shredding or pulverizing the outer housing.

EXAMPLE 14

The method of any of Examples 12 through 13, wherein disfiguring the outer housing includes disfiguring the outer housing in the presence of the liquid.

EXAMPLE 15

The method of any of Examples 12 through 14, wherein disfiguring the outer housing includes disfiguring the outer housing while the outer housing is submerged within the liquid.

EXAMPLE 16

A method of destructively processing an airbag inflator having an outer housing, a propellant housed within the outer housing, and a membrane disposed between the propellant and an inner surface of the outer housing, the method comprising: (a) puncturing the membrane; (b) exposing the airbag inflator with the punctured membrane to a liquid; (c) permitting the propellant to mix with the liquid to form a liquid-propellant mixture; and (d) treating the liquid-propellant mixture to remove at least a portion of the liquid from the liquid-propellant mixture.

EXAMPLE 17

The method of Example 16, wherein exposing the airbag inflator to the liquid includes submerging the airbag inflator in a liquid bath.

EXAMPLE 18

The method of any of Examples 16 through 17, wherein permitting the propellant to mix with the liquid to form a liquid-propellant mixture includes permitting the propellant to at least partially dissolve into the liquid to form a liquid-propellant solution.

EXAMPLE 19

The method of Example 18, further comprising applying at least one of heat or ultrasonic energy to the liquid to accelerate dissolution of the propellant into the liquid.

EXAMPLE 20

A method of destructively processing an airbag inflator having an outer housing and a propellant housed within the outer housing, the method comprising: (a) disfiguring the outer housing and thereby releasing at least some of the propellant from the airbag inflator; (b) exposing the released propellant to a liquid; and (c) permitting the released propellant to mix with the liquid to form a liquid-propellant mixture.

IV. Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described an exemplary embodiment of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A method of destructively processing an airbag inflator having an outer housing, a propellant housed within the outer housing, and a membrane disposed between the propellant and an inner surface of the outer housing, the method comprising:
   (a) rupturing the membrane;
   (b) exposing the propellant to a liquid; and
   (c) permitting the propellant to mix with the liquid to form a liquid-propellant mixture.

2. The method of claim 1, wherein the propellant comprises ammonium nitrate.

3. The method of claim 1, further comprising removing at least a portion of the liquid from the liquid-propellant mixture.

4. The method of claim 3, wherein removing at least a portion of the liquid from the liquid-propellant mixture includes producing an at least partially solidified material that includes the propellant.

5. The method of claim 4, wherein the at least partially solidified material has a moisture content less than or equal to 50%.

6. The method of claim 1, wherein the outer housing includes at least one aperture that opens to the membrane, wherein rupturing the membrane includes puncturing the membrane through the at least one aperture.

7. The method of claim 6, wherein the at least one aperture includes a plurality of apertures, wherein rupturing the membrane includes puncturing the membrane at discrete locations through the apertures.

8. The method of claim 7, wherein the apertures are spaced apart about a circumference of the outer housing.

9. The method of claim 1, wherein exposing the propellant to the liquid includes positioning the airbag inflator having the ruptured membrane within a liquid bath.

10. The method of claim 1, wherein permitting the propellant to mix with the liquid includes permitting the propellant to at least partially dissolve into the liquid to create a liquid-propellant solution.

11. The method of claim 10, further comprising applying at least one of heat or ultrasonic energy to the liquid bath to accelerate dissolution of the propellant into the liquid.

12. The method of claim 1, wherein rupturing the membrane includes disfiguring the outer housing and thereby releasing the propellant from the outer housing.

13. The method of claim 12, wherein disfiguring the outer housing includes at least one of shredding or pulverizing the outer housing.

14. The method of claim 12, wherein disfiguring the outer housing includes disfiguring the outer housing in the presence of the liquid.

15. The method of claim 14, wherein disfiguring the outer housing includes disfiguring the outer housing while the outer housing is submerged within the liquid.

16. A method of destructively processing an airbag inflator having an outer housing, a propellant housed within the outer housing, and a membrane disposed between the propellant and an inner surface of the outer housing, the method comprising:
   (a) puncturing the membrane;
   (b) exposing the airbag inflator with the punctured membrane to a liquid;
   (c) permitting the propellant to mix with the liquid to form a liquid-propellant mixture; and
   (d) treating the liquid-propellant mixture to remove at least a portion of the liquid from the liquid-propellant mixture.

17. The method of claim 16, wherein exposing the airbag inflator to the liquid includes submerging the airbag inflator in a liquid bath.

18. The method of claim 16, wherein permitting the propellant to mix with the liquid to form a liquid-propellant mixture includes permitting the propellant to at least partially dissolve into the liquid to form a liquid-propellant solution.

19. The method of claim 18, further comprising applying at least one of heat or ultrasonic energy to the liquid to accelerate dissolution of the propellant into the liquid.

* * * * *